US010114876B2

(12) United States Patent
Parashar et al.

(10) Patent No.: US 10,114,876 B2
(45) Date of Patent: Oct. 30, 2018

(54) DATA AUGMENTATION BETWEEN DEVICES USING VISUAL CODE

(71) Applicants: Divya Parashar, Haridwar (IN); Sujit A. Ramesh, Bangalore (IN)

(72) Inventors: Divya Parashar, Haridwar (IN); Sujit A. Ramesh, Bangalore (IN)

(73) Assignee: SAP SE, Walldorf (DE)

( * ) Notice: Subject to any disclaimer, the term of this patent is extended or adjusted under 35 U.S.C. 154(b) by 516 days.

(21) Appl. No.: 14/584,234

(22) Filed: Dec. 29, 2014

(65) Prior Publication Data

US 2016/0188679 A1   Jun. 30, 2016

(51) Int. Cl.
*G06F 17/30* (2006.01)

(52) U.S. Cl.
CPC .. *G06F 17/30554* (2013.01); *G06F 17/30572* (2013.01)

(58) Field of Classification Search
CPC ............. G06F 21/31; G06F 17/3012; G06F 17/30879; G06F 17/30887
See application file for complete search history.

(56) References Cited

U.S. PATENT DOCUMENTS

| | | | | |
|---|---|---|---|---|
| 8,239,840 | B1* | 8/2012 | Czymontek | G06F 8/34 717/125 |
| 9,348,929 | B2* | 5/2016 | Eberlein | G06F 17/30887 707/1 |
| 2012/0215669 | A1* | 8/2012 | Lieberman | G06Q 40/123 705/31 |
| 2013/0187926 | A1* | 7/2013 | Silverstein | G06Q 10/105 345/440 |
| 2014/0229251 | A1* | 8/2014 | Lim | G06Q 30/0252 705/14.5 |
| 2015/0039986 | A1* | 2/2015 | Thomas | H04L 51/08 715/221 |
| 2015/0054917 | A1* | 2/2015 | Coon | G06T 7/00 348/46 |

* cited by examiner

*Primary Examiner* — Carol Choi
(74) *Attorney, Agent, or Firm* — Fountainhead Law Group P.C.

(57) ABSTRACT

In one embodiment, a method determines a data set stored in a database system and stores a visualization that is generated using the data set. A visual code is generated for the visualization where the visual code includes a link to the stored visualization. The method then outputs the visual code with the data set. A request via the link is received from a mobile device where the request is generated in response to the mobile device capturing the visual code. The method outputs the stored visualization to the mobile device in response to receiving the request.

20 Claims, 10 Drawing Sheets

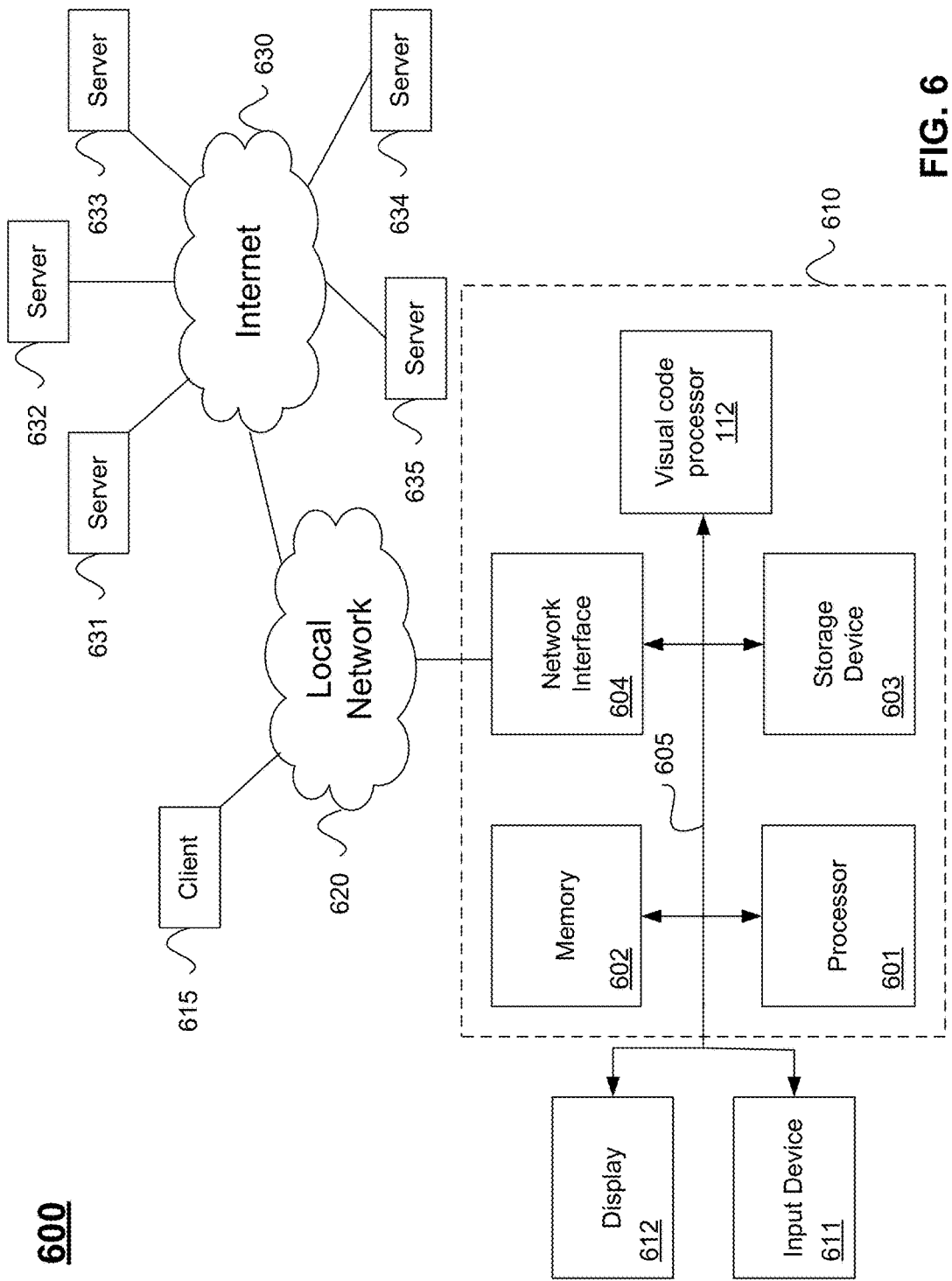

DATA AUGMENTATION BETWEEN DEVICES USING VISUAL CODE

BACKGROUND

In business intelligence (BI), users can analyze historical data and churn turnkey insights and hidden information to assist in decision-making. Self-service business intelligence tools help users to generate visualizations and informational graphics without the help of an information technology specialist or report administrator.

Most business intelligence applications follow a typical process for analyzing data, creating visualizations, and providing the results on different devices. Typically, a user has to log on to the database system to access the data and create the visualizations. Also, if a visualization for a data set has already been created and the user wants to access the visualization on another device, the user has to log in using the other device and then retrieve the visualization for the data set. This may be complicated and inefficient for the user. For example, the user has already opened the data set on one device and then has to log in and access the data set again before accessing or generating the visualization.

SUMMARY

In one embodiment, a method determines a data set stored in a database system and stores a visualization that is generated using the data set. A visual code is generated for the visualization where the visual code includes a link to the stored visualization. The method then outputs the visual code with the data set. A request via the link is received from a mobile device where the request is generated in response to the mobile device capturing the visual code. The method outputs the stored visualization to the mobile device in response to receiving the request.

In one embodiment, a non-transitory computer-readable storage medium contains instructions, that when executed, control a computer system to be configured for: determining a data set stored in a database system; storing a visualization that is generated using the data set; generating a visual code for the visualization, the visual code including a link to the stored visualization; outputting the visual code with the data set, the visual code including a link to the visualization; receiving a request via the link from a mobile device, the request generated in response to the mobile device capturing the visual code; and outputting the stored visualization to the mobile device in response to receiving the request.

In one embodiment, a method includes: opening an application on a mobile device for a user; using the application to capture a visual code for a visualization, the visualization being generated using a data set stored in a database system; determining a link encoded in the visual code, the link being associated with the stored visualization; sending a request via the link from the mobile device, the request generated in response to the mobile device capturing the visual code; and receiving the stored visualization at the mobile device in response to sending the request.

The following detailed description and accompanying drawings provide a better understanding of the nature and advantages of particular embodiments.

BRIEF DESCRIPTION OF THE DRAWINGS

FIG. 6 illustrates hardware of a special purpose computing machine configured with visual code processor according to one embodiment.

DETAILED DESCRIPTION

Described herein are techniques for accessing a visualization using a visual code. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a user a way to display a data visualization for a data set on a mobile device. For example, a user may access a database server and display the data set on a first device. In another embodiment, the user may print out the data set on a non-electronic medium, such as a piece of paper. The data set may include a visual code, such as a quick response (QR) code, that is associated with a visualization of the data set. The visualization may be generated using the data set. For example, the visualization may include a chart generated using the data set.

The user can use a mobile device to capture the visual code associated with the data set, such as by using a scanning component of the mobile device to capture the visual code. By capturing the visual code, the mobile device may then automatically send a request for the visualization along with user credentials for the user. The database system receives the request, authenticates the user credentials, and then provides the visualization for the data set to the user's mobile device. In this case, the user does not have to log in to the database system using the mobile device, access the data set, and then access the visualization for the data set. Rather, the capturing of the visual code can automatically retrieve and display the visualization.

Figure 1:
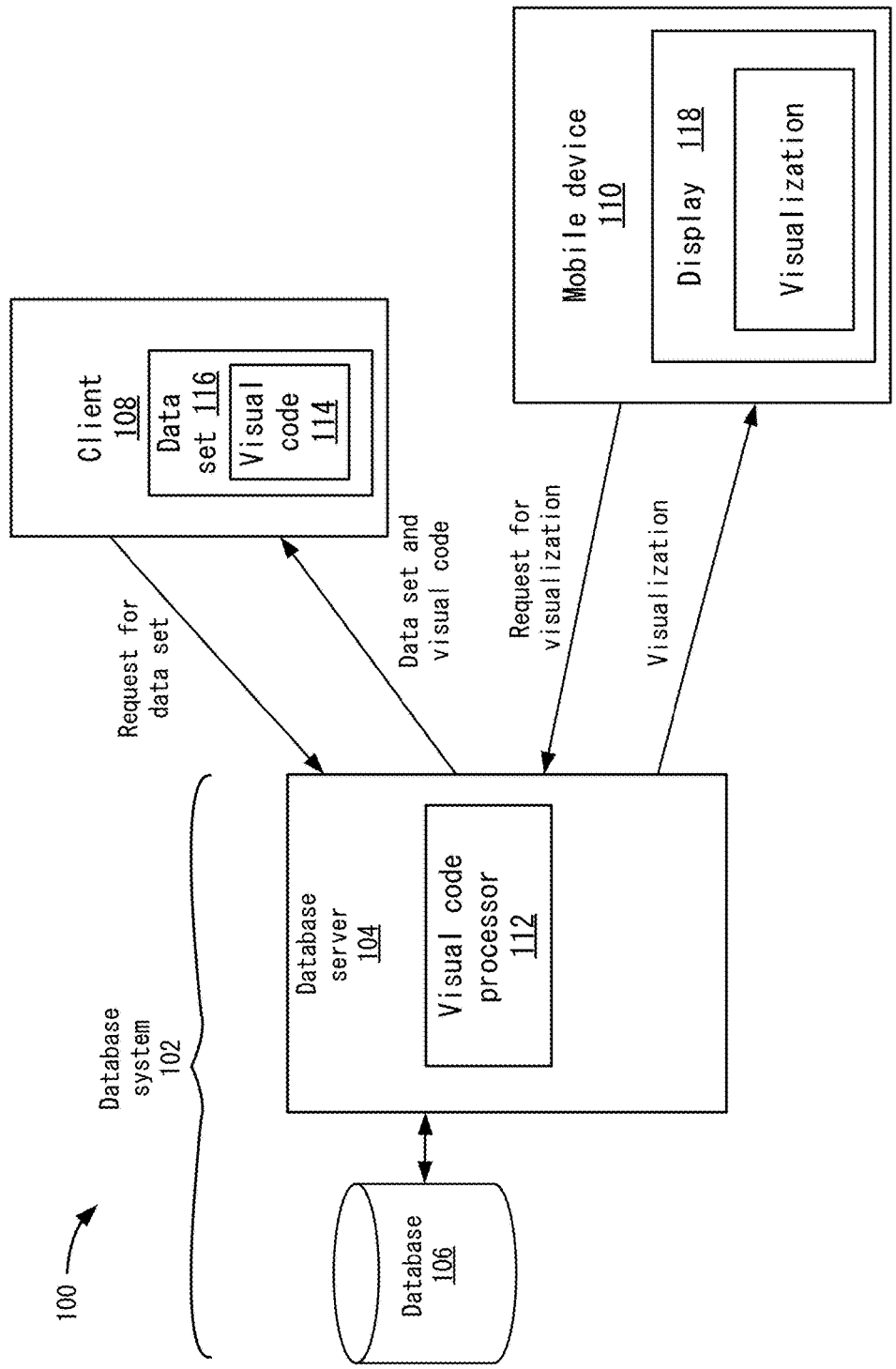
FIG. 1 depicts a simplified system for providing access to a data set and visualizations for the data set according to one embodiment.

FIG. 1 depicts a simplified system 100 for providing access to a data set and visualizations for the data set according to one embodiment. System 100 includes a database system 102 that includes a database server 104 and a database 106. Database server 104 includes a visual code processor 112 that can process requests for visualizations based on the scanning of a visual code 114 associated with a representation of a data set 116. Also, system 100 includes a client 108 and a mobile device 110.

Database 106 may store data sets in data tables. Database server 104 may create the data set and store it in database tables in database 106. A person of skill in the art will appreciate the storing of data sets, format of the data sets, and the different database structures that can be used. Also, database server 104 can create a visualization of the data set. The visualization may use the data from the data set found in the data tables to create the visualization. The visualization may be a visual representation of the data in the data tables, such as a chart, graph, or other visual representation. Database server 104 may store the visualizations in database 106 with a key or unique identifier that allows the visualization to be retrieved using the key or unique identifier. When storing the visualization is discussed, metadata for the visualization may be stored that allows the creation of the visualization.

A user may use client 108 to log in to database system 102. The logging in to database system 102 may require credentials for the user, such as a username and password. Database server 104 may validate the credentials and allow client 108 to access data from database 106. For example, client 108 may send a request for the data set to database server 104, which responds with the data set. In one example, database server 104 may retrieve the data set from the data tables. An application on client 108, such as a business intelligence application, then displays data set 116. In one embodiment, data set 116 may be displayed on a user interface, such as a computer monitor or other display on any type of device. In another embodiment, data set 116 may be a non-electronic medium, such as a piece of paper on which data set 116 is included. The format that data set 116 is displayed in may be a grid format, such as row and column format or faceted format, that displays data set 116 without visualizations.

As discussed above, data set 116 is associated with visual code 114. Visual code 114 may be displayed within data set 116, within the application displaying data set 116, or separate from data set 116. Also, if a non-electronic medium, such as paper, is being used, QR code 114 may be included on the same non-electronic medium that includes data set 116. In one embodiment, visual code 114 is displayed such that a user can readily determine the code is related to data set 116. In this way, a user can quickly determine where to request a visualization using a visual code 114 when viewing a specific data set 116.

At some point, the user may want to view a visualization of data set 116. A user may use mobile device 110 to capture a representation of QR code 114. Mobile device 110 may be any type of device that can capture visual code 114, such as a smartphone, tablet device, camera, laptop computer, etc. In one example, the user opens an application that can scan visual code 114. For example, the application may be associated with the company that provided the database system and also requires the user log into the application. Then, a scanning component, such as the mobile device camera, captures a representation of visual code 114. Mobile device 110 then determines a link encoded in visual code 114. The link may be used to retrieve the visualization in database system 102. For example, the link may be a uniform resource locator (URL) associated with the visualization. Mobile device 110 sends a request for the visualization to database system 102 using the link. The request may also include user credentials for the user of mobile device 110. Mobile device 110 may automatically generate this request upon capturing visual code 114.

A visual code processor 112 in database server 104 may receive the request for the visualization. Visual code processor 112 may authenticate the user using the user credentials provided in the request. The authentication may authenticate whether the user is allowed to access the requested visualization and/or the data set. Upon authentication, visual code processor 112 may then request the visualization from database 106 and return the visualization of the data set to mobile device 110. Mobile device 110 can then send display the visualization on a display 118 of mobile device 110. For example, the application may display the visualization.

Figure 2A:
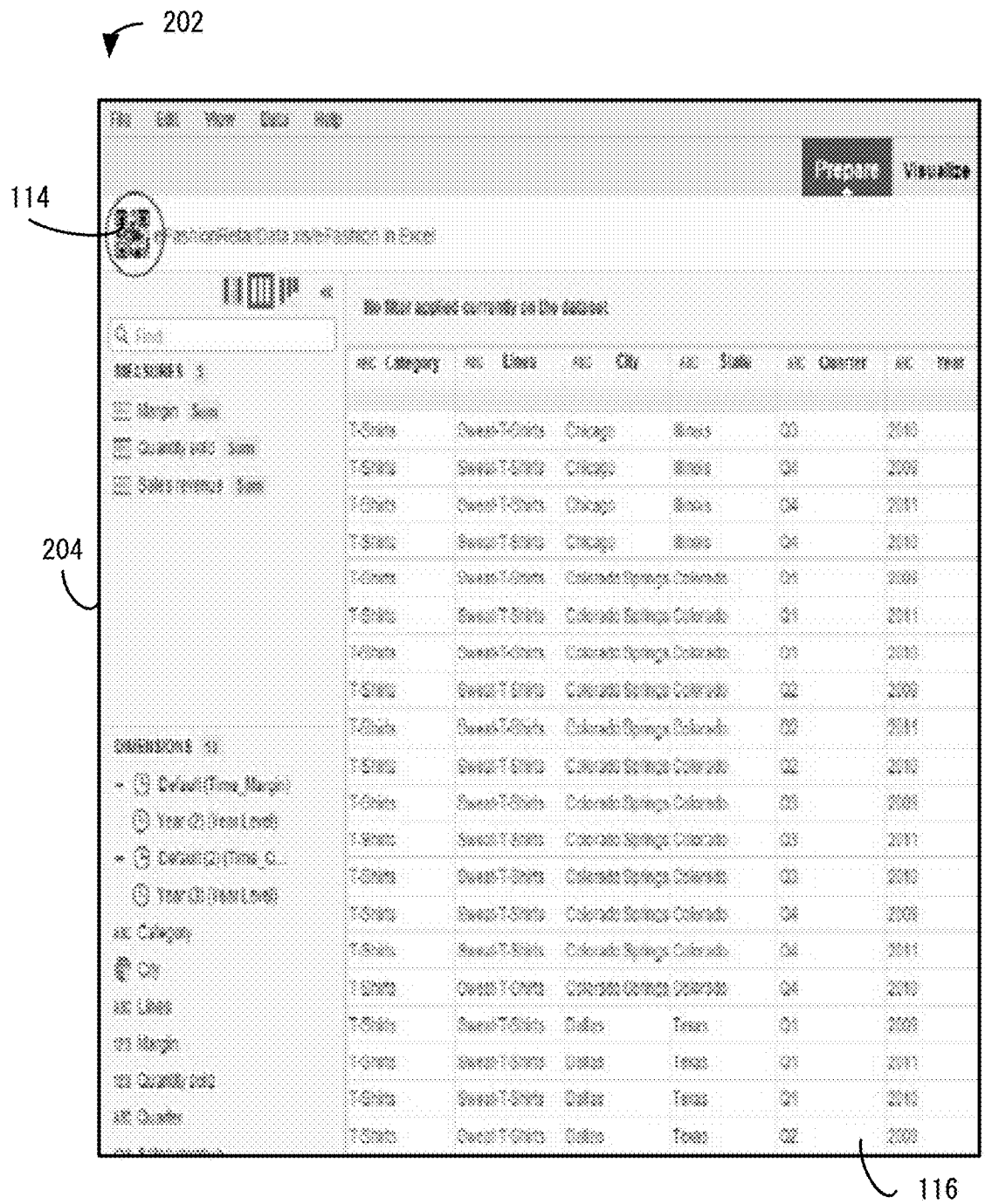
FIG. 2A shows an example of a user interface on a client according to one embodiment.
Figure 2B:
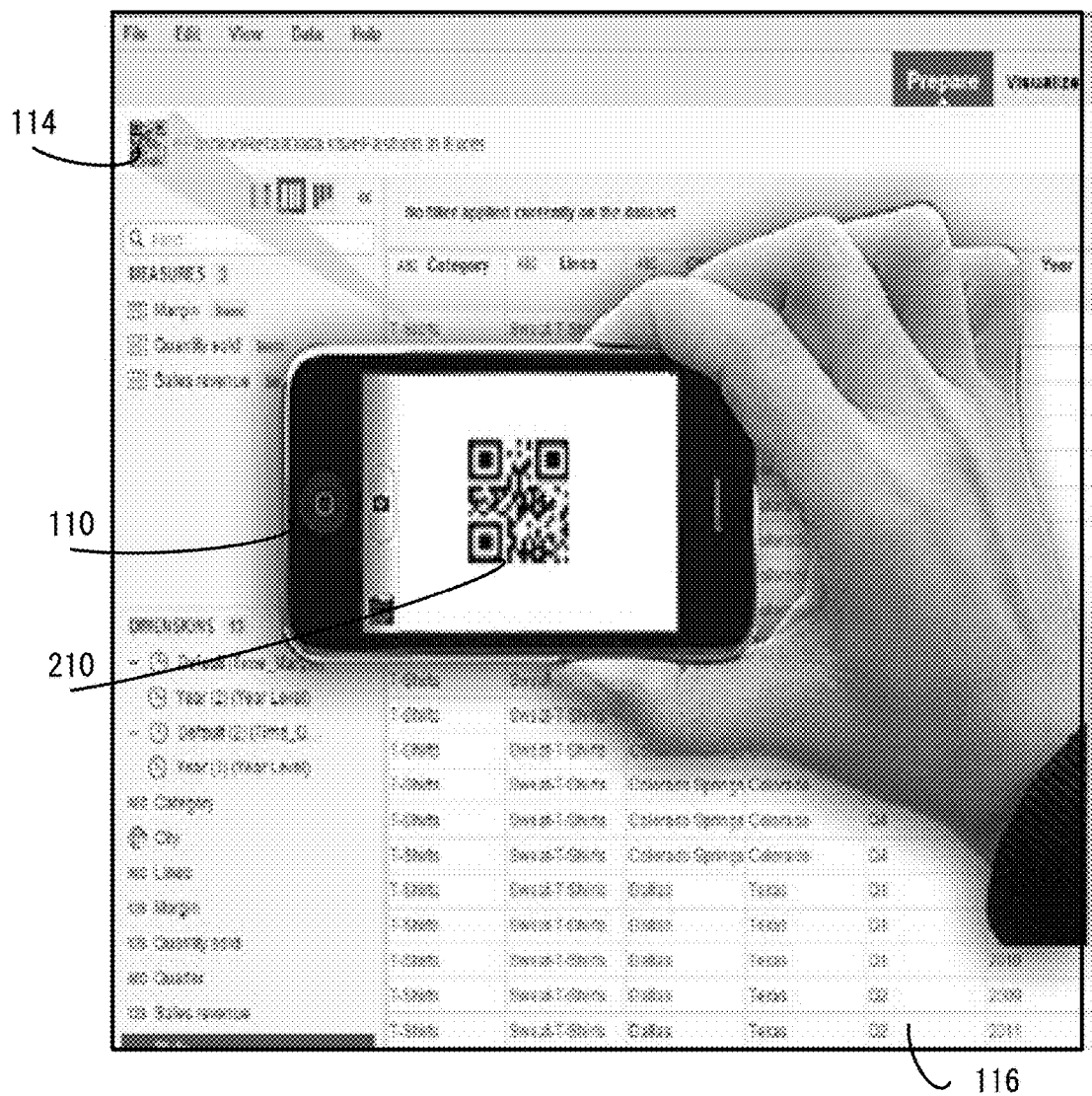
FIG. 2B discloses an example of capturing a visual code according to one embodiment.

FIGS. 2A-2B depict the visualization request process in more detail according to one embodiment. FIG. 2A shows an example of a user interface 202 on a client 108 according to one embodiment. An application 204 is displaying a data set 116, which is in a grid format. Other formats may also be appreciated. Application 204 is also displaying a visual code 114 that is associated with the data set 116 being displayed in application 204. Visual code 114 may be a thumbnail that displays the visual code that has been generated by a database system 102 for a visualization of data set 116. Also, visual code 114 has been displayed at a location in application 204 such that the user can associate visual code 114 with data set 116.

FIG. 2B discloses an example of capturing visual code 114 according to one embodiment. A user is using mobile device 110 to capture visual code 114. For example, mobile device 110 uses a scan utility application to capture a representation of visual code 114. As shown, a user has pointed a camera of mobile device 110 at visual code 114 to capture a representation of visual code 114 shown at 210 in mobile device 110. Although the scan utility is described, any visual code reader may be used to capture visual code 114.

Once capturing visual code 114, mobile device 110 may determine a link to the visualization that is encoded within visual code 114 and also credentials for the user. The credentials may be determined based on the user using the visual code scan utility application or a user may have input the credentials. However, even though credentials are determined, the user does not have to have an active connection or have established an active connection with database system 102 to access the visualization. Rather, the capture of visual code 114 is all that is needed to start the process of requesting the visualization after providing credentials to the scan utility application.

Figure 2C:
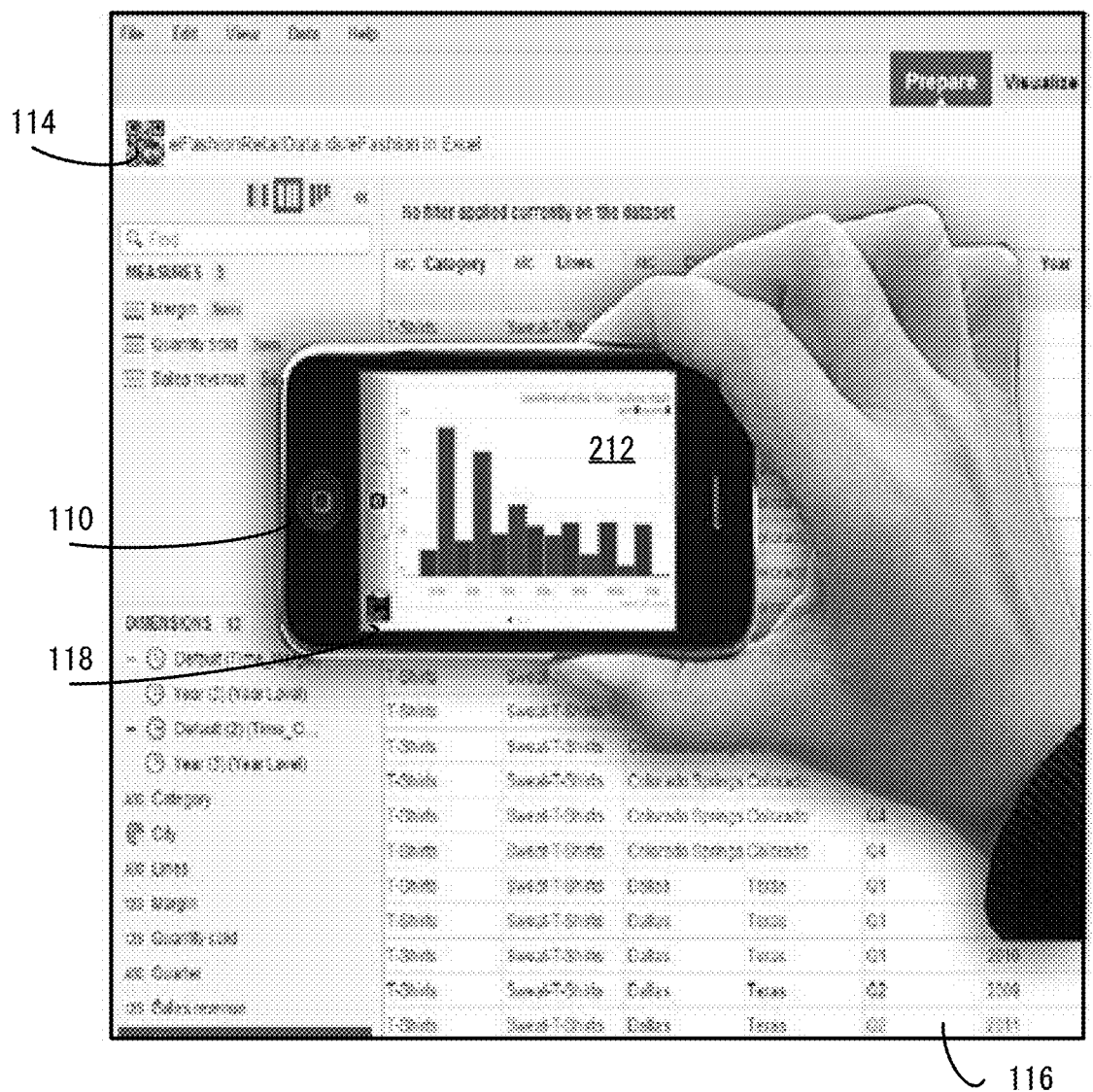
FIG. 2C shows an example of displaying the visualization on a mobile device according to one embodiment.

FIG. 2C shows an example of displaying the visualization on mobile device 110 according to one embodiment. As can be seen on display 118 of mobile device 110, a visualization of a chart is shown at 212. The visualization summarizes data of data set 116 in a chart. This creates an augmented user experience by transforming the data set 116, which is in the grid format on client 108, to a best-fit visualization for mobile device 110. For example, the visualization of the chart is formatted to fit onto display 118 of mobile device 110.

To display the visualization in display 118, mobile device 110 decodes visual code 114 to determine the link encoded within the code. Mobile device 110 then sends the request to the link with the credentials as discussed above. Visual code processor 112 in database server 106 authenticates the credentials and verifies that the user is allowed to access the visualization and also data set 116. Visual code processor 112 uses the link to retrieve the visualization. For example, visual code processor 112 determines a unique identifier to the visualization using the link, and uses the identifier to retrieve the visualization. Once retrieved, database server 104 sends the visualization to mobile device 110, which can then display the visualization in display 118.

Figure 2D:
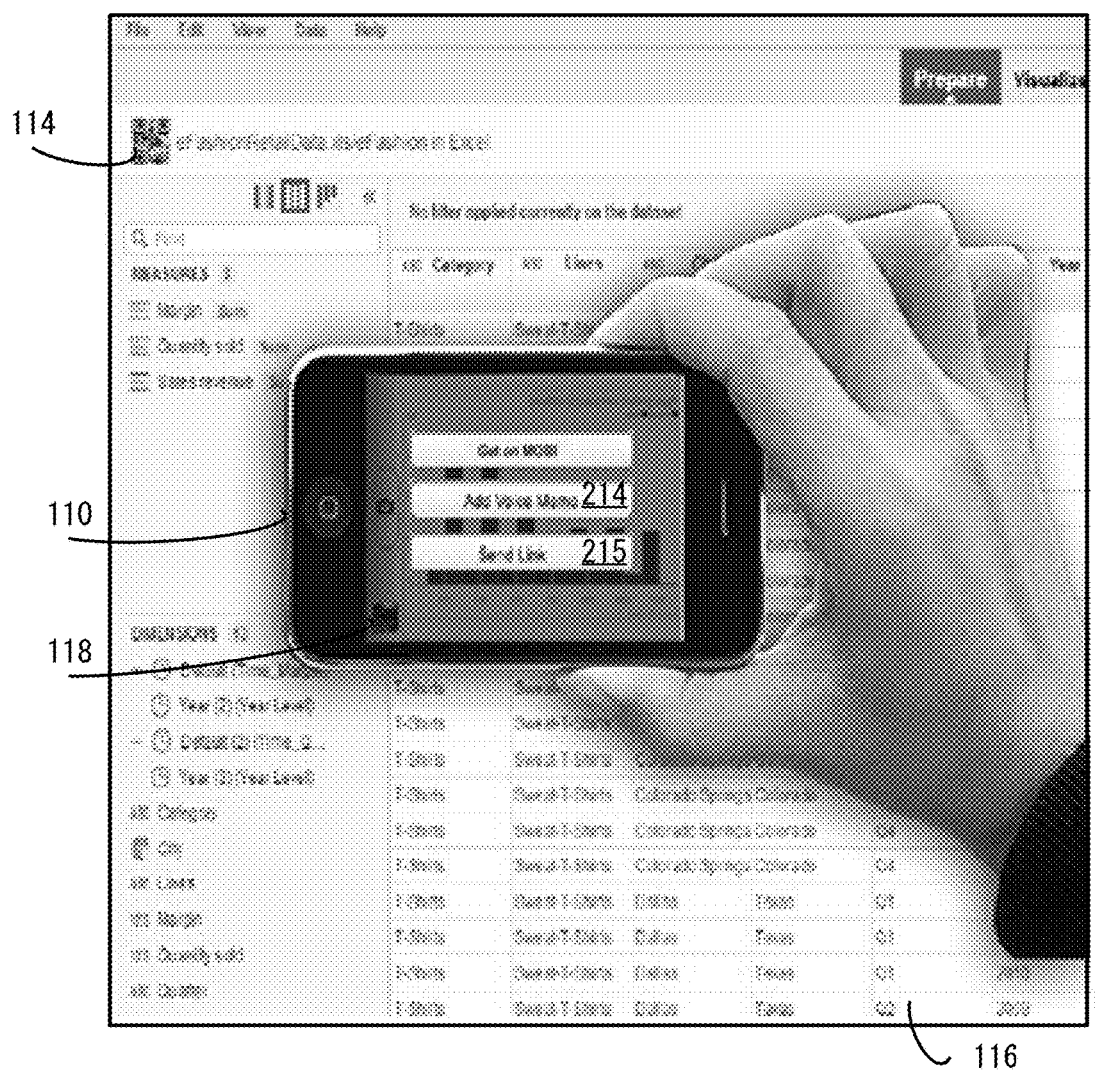
FIG. 2D shows other options that are provided in display for the visualization.

After receiving the visualization, the user may perform multiple actions with the visualization. For example, the user may take a snapshot of the visualization, such as a taking a screenshot using commands provided by mobile device 110. Additionally, a user may perform other options that are provided in display 118 as shown in FIG. 2D. For example, a user may be able to add a voice memo using an option 214 in display 118. This may add a voice memo to the visualization that can be synched with the visualization stored in database 106. Other options may also be provided, such as sending the link to another device at 215. This may allow the user to share the respective visualization with other users using the link or send the same visual code 114 to another user.

Figure 2E:
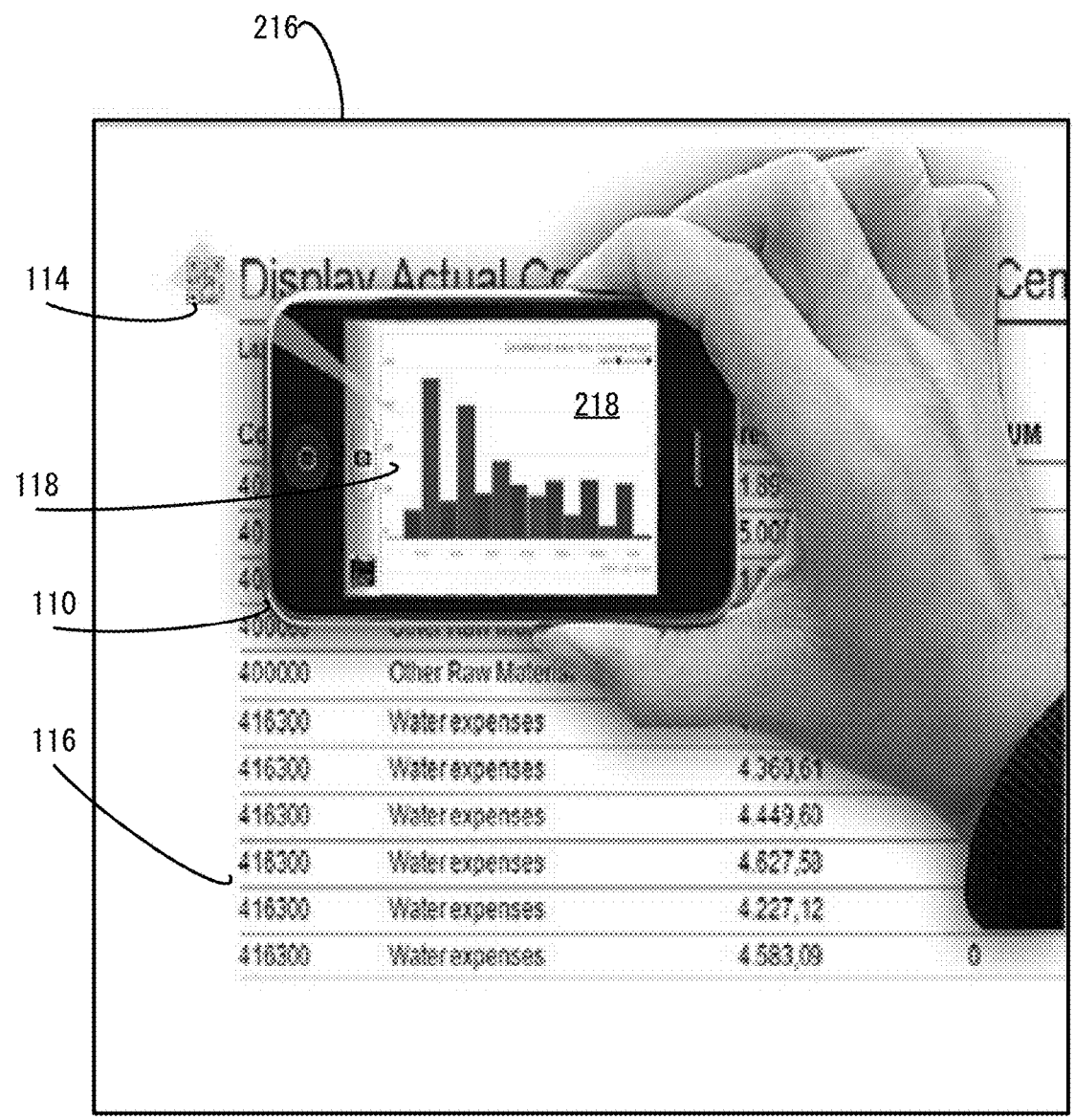
FIG. 2E shows an example of capturing a visual representation on a non-electronic medium according to one embodiment.

Particular embodiments may also be used to capture visual code 114 on a non-electronic medium, such as a piece of paper. FIG. 2E shows an example of capturing visual representation 114 on a non-electronic medium 216 according to one embodiment. Non-electronic medium 216 may be a piece of paper on which data set 116 has been printed. Visual code 114 can be captured by mobile device 110 in the same manner as described above with the electrical medium. However, by providing visual code 114 on the non-electronic medium 216, users can still access visualizations in database 106 automatically by capturing visual code 114 even when viewing data sets offline (e.g., in a meeting). As can be seen on display 118 of mobile device 110, a visualization of a chart is shown at 218.

Figure 3:
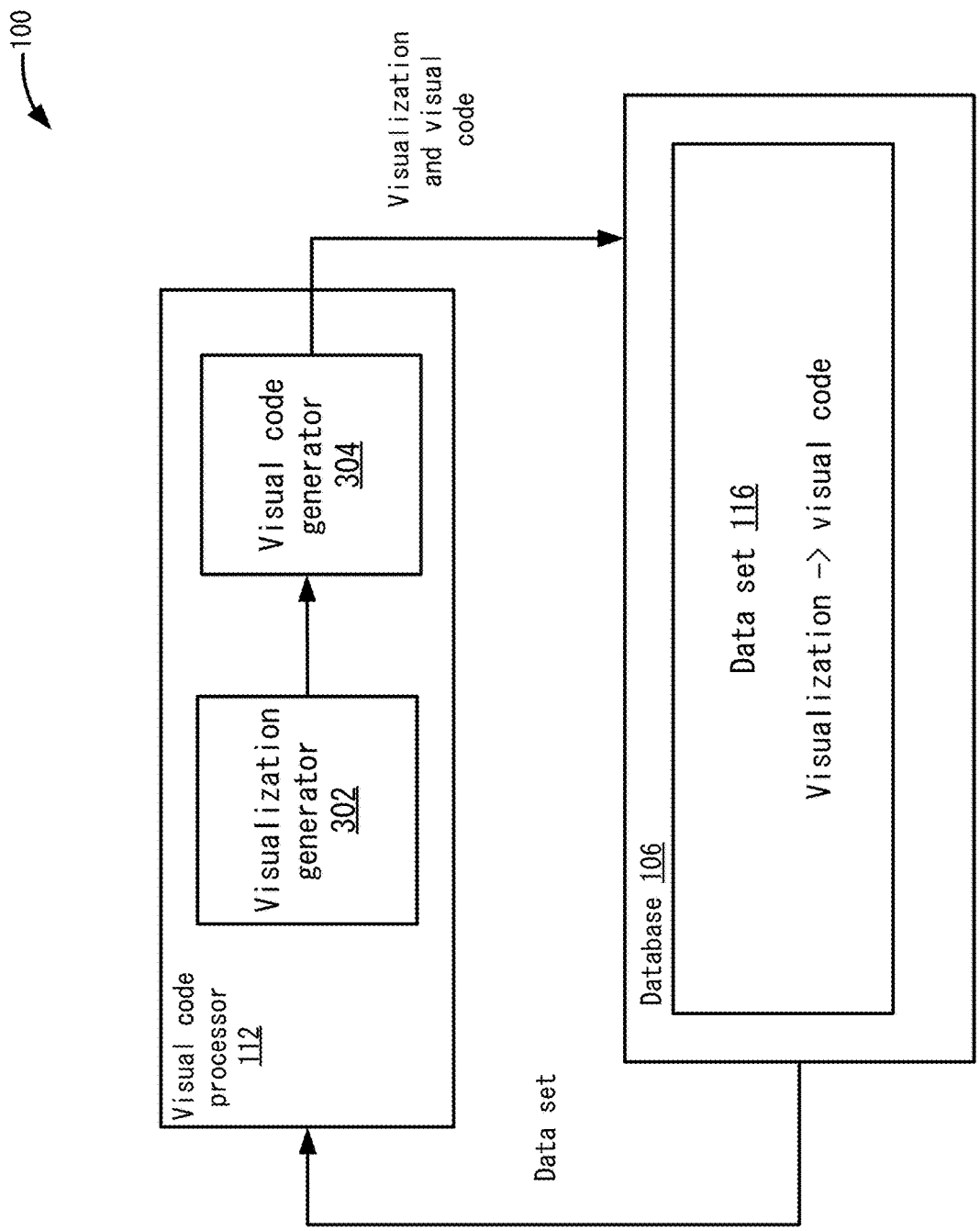
FIG. 3 shows a more detailed example of a database system according to one embodiment.

Before providing visual codes 114 for data sets 116, database system 102 needs to generate visual representations 114 and provide an infrastructure for responding to requests for visual representations. FIG. 3 shows a more detailed example of database system 102 according to one embodiment. Visual code processor 112 includes a visualization generator 302 that receives data sets from database 106. Visualization generator 302 can then generate visualizations for each data set. The visualizations that can be generated include charts, graphs, or other visualizations. A user may provide input that generates the different types of visualizations for each data set. For example, it is possible that a data set may have multiple visualizations.

Once visualization generator 302 generates the visualization, a visual code generator 304 generates the visual code for the visualization. First, visual code generator 304 may determine a link for the visualization, such as a URL. Visual code generator 304 can then convert the URL into a visual code, such as by using a hash map of the link. Then, visual code generator 304 stores the visual code into database 106 with an association with the respective visualization.

Figure 4:
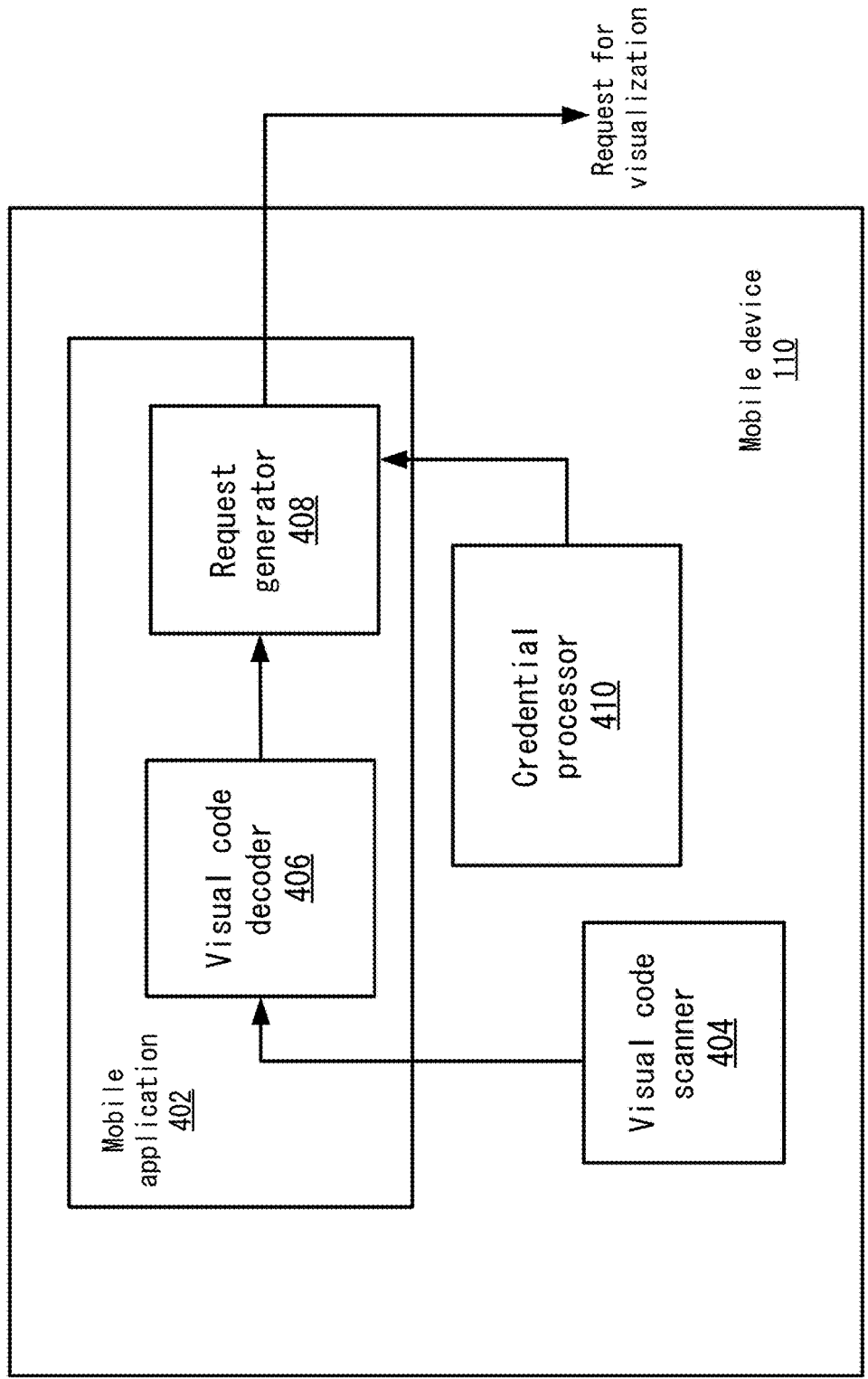
FIG. 4 shows a more detailed example of a mobile device according to one embodiment.

FIG. 4 shows a more detailed example of mobile device 110 according to one embodiment. Mobile device 110 includes a mobile application 402 that can process visual codes. Also, a visual code scanner 404 can capture visual code 114. Then, a visual code decoder 406 processes the visual code to determine a link associated with the visual code. For example, visual code decoder 406 decodes the hash of the link from visual code 114.

Visual code decoder 406 then forwards the link to a request generator 408. As mentioned above, credentials should be attached to the request and thus a credential processor 410 determines credentials for the user and provides them to request generator 408. Request generator 408 then generates a request for the visualization based on the link and the user's credentials. Also, request generator 408 may add any other metadata that may be applicable to the request for the visualization. For example, the metadata may include characteristics for mobile device 110, such as display characteristics, processing capabilities, connection bandwidth, etc. The metadata may also include the dataset identifier, unique identifier for the visualization, and username for the user. The display characteristics allow database system 102 to customize the visualization for mobile device 110, such as a visualization at the correct resolution for the display of mobile device 110 can be provided.

Figure 5:
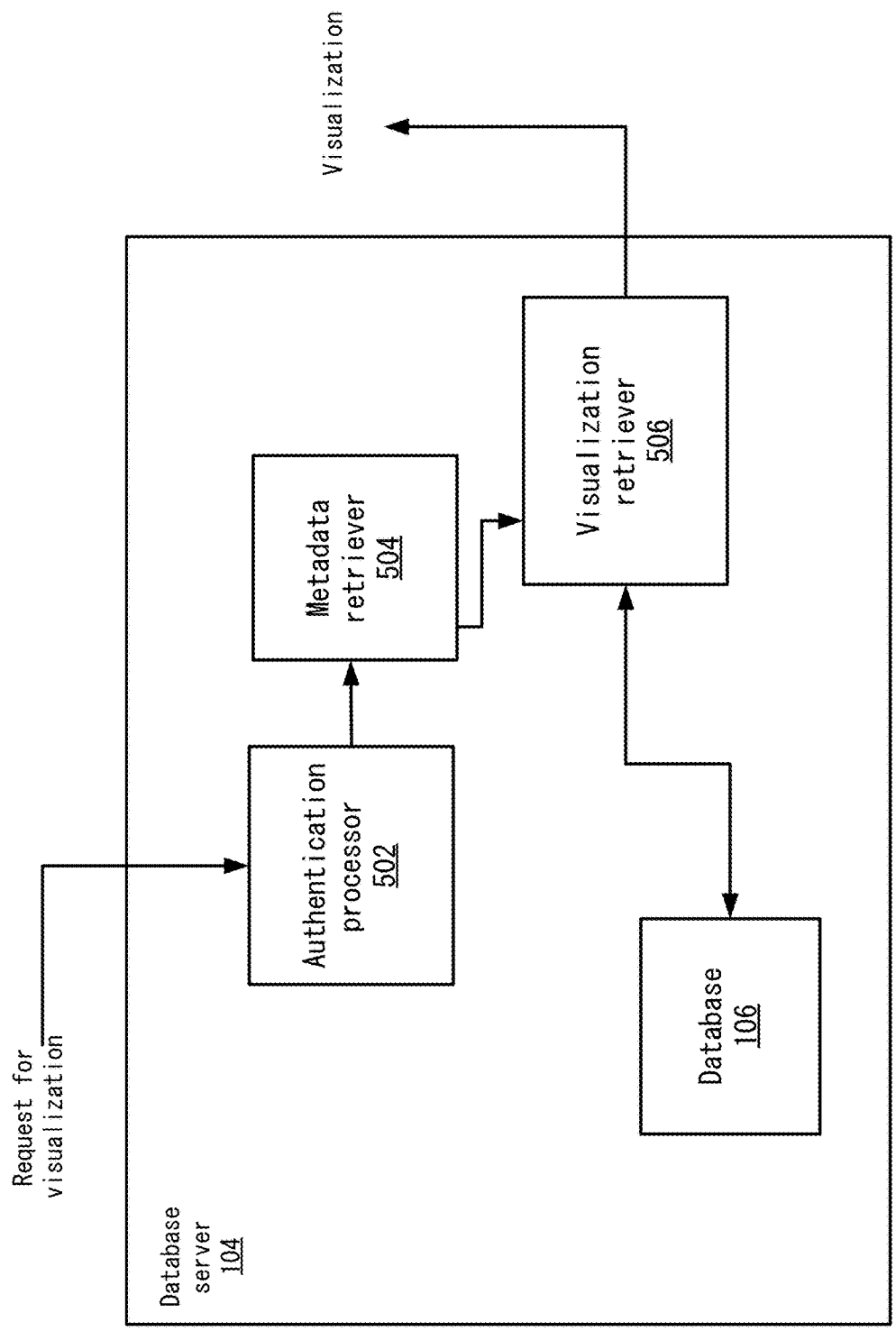
FIG. 5 depicts a more detailed example of a database server for processing a request for a visualization according to one embodiment.

FIG. 5 depicts a more detailed example of database server 104 for processing a request for a visualization according to one embodiment. An authentication processor 502 receives the request. Authentication processor 502 can determine the credentials found in the request and authenticate the user based on the link received. For example, authentication processor 502 determines whether the user is allowed to access the visualization associated with the link. Assuming the user is a valid user, a metadata retriever 504 determines metadata from the link. The metadata from the link may include the device characteristics.

A visualization retriever 506 then uses the link (and metadata) to retrieve the associated visualization from database 102. For example, the visualization may be stored and associated with a unique identifier or a primary key. The link may be used to determine the unique identifier, which visualization retriever 506 uses to retrieve the visualization. Once the visualization is retrieved, visualization retriever 506 may format the visualization based on the metadata. Also, visualization retriever 506 can then send the visualization to mobile device 110. For example, a serializer may stream the visualization in a format that can be understood by mobile device 110.

Accordingly, a user experience is augmented by allowing a user to view visualizations associated with a data set. To provide the access to the visualizations, database system 102 should always be able to respond to requests in real time. In this case, database server 104 should be always running and be able to access database 106 when a request is received. This may be important because instead of receiving an affirmative log in from a user to access database 106 through database server 104, a user is scanning visual code 114 and sending the request without affirmatively logging in to database server 104. This improves the functioning of database server 104 and mobile device 110 by providing a process that allows the user to retrieve a visualization by scanning visual code 114. Making database server 104 a real time application allows the use of visual codes and providing of visualizations by scanning of the codes. Particular embodiments also make non-electronic medium a conduit to providing electrical versions of visualizations. This may be helpful when printed documents of the data sets are provided to users who may want to view the visualizations using mobile device 110.

FIG. 6 illustrates hardware of a special purpose computing machine configured with visual code processor 112 according to one embodiment. An example computer system 610 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable storage mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information through the network interface 604 across a local network 620, an Intranet, or the Internet 630. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    determining, by a computing device, a data set stored in one or more database tables in a database system;
    receiving, by the computing device, a visualization that was created using data from the data set that is stored in the one or more database tables;
    storing, by the computing device, the visualization in the one or more database tables;
    generating, by the computing device, a visual code for the visualization, the visual code including a link to the stored visualization;
    after creating the visualization, outputting, by the computing device, the visual code with at least a portion of the data from the data set, wherein the data from the at least the portion of the data set that is output is output in a grid format that is different from the stored visualization;
    receiving, by the computing device, a request via the link from a mobile device, the request generated in response to the mobile device capturing the visual code;
    using, by the computing device, the link to retrieve the visualization from the one or more database tables, wherein the visualization is stored with a key in the database table with the data set, the key allowing the visualization to be retrieved; and
    outputting, by the computing device, the stored visualization to the mobile device in response to receiving the request, the stored visualization summarizing the at least the portion of the data set that is output in the grid format.

2. The method of claim 1, further comprising:
    determining, by the computing device, a user associated with the request; and
    authenticating, by the computing device, the user before allowing the outputting of the stored visualization.

3. The method of claim 2, wherein:
    the request includes a credential associated with the user, and
    authenticating comprises authenticating, by the computing device, the credential to determine if the user is allowed to access the visualization.

4. The method of claim 1, wherein outputting the visual code comprises:
    outputting, by the computing device, the visual code on a non-electronic medium that includes the data set.

5. The method of claim 1, wherein outputting the visual code comprises:
    outputting, by the computing device, the visual code on a user interface displaying the data set, the user interface associated with a device different from the mobile device.

6. The method of claim 1, further comprising:
    receiving, by the computing device, a first log in to access the data set at the database system, wherein a second log in to access the visualization prior to receiving the request for the visualization is not required to receive the visualization at the mobile device.

7. The method of claim 1, wherein the request is generated automatically based on the capture of the visual code.

8. The method of claim 1, wherein the visual code comprises a quick response code.

9. The method of claim 1, wherein the mobile device performs an action associated with the visualization, the method further comprising:
  storing, by the computing device, a result of the action with the data set.

10. The method of claim 9, wherein the action comprises adding a voice memo or taking a snapshot of the visualization using the mobile device.

11. The method of claim 1, wherein:
  the request includes metadata about characteristics for the mobile device, and
  the visualization is formatted based on the characteristics.

12. The method of claim 1, wherein:
  the visualization is in a non-grid format.

13. A non-transitory computer-readable storage medium containing instructions, that when executed, control a computer system to be configured for:
  receiving a visualization that was created using data from the data set that is stored in the one or more database tables;
  storing the visualization in the one or more database tables;
  generating a visual code for the visualization, the visual code including a link to the stored visualization;
  after creating the visualization, outputting the visual code with at least a portion of the data from the data set, wherein the data from the at least the portion of the data set that is output is output in a grid format that is different from the stored visualization;
  receiving a request via the link from a mobile device, the request generated in response to the mobile device capturing the visual code;
  using the link to retrieve the visualization from the one or more database tables, wherein the visualization is stored with a key in the database table with the data set, the key allowing the visualization to be retrieved; and
  outputting the stored visualization to the mobile device in response to receiving the request, the stored visualization summarizing the at least the portion of the data set that is output in the grid format.

14. The non-transitory computer-readable storage medium of claim 13, wherein outputting the visual code comprises:
  outputting the visual code on a non-electronic medium that includes the data set.

15. The non-transitory computer-readable storage medium of claim 13, further comprising:
  receiving a first log in to access the data set at the database system, wherein a second log in to access the visualization prior to receiving the request for the visualization is not required to receive the visualization at the mobile device.

16. A method comprising:
opening an application on a mobile device for a user;
using, by the mobile device, the application to capture a visual code for a visualization being displayed with at least a portion of data from a data set that is output is output in a grid format, the visualization being created using at least a portion of data from a data set stored in one or more database tables in a database system and the visualization being stored in the one or more database tables, wherein the at least a portion of data from the data set that is output is output in a grid format is in a format different from the stored visualization;
determining, by the mobile device, a link encoded in the visual code, the link being associated with the stored visualization in the one or more database tables;
sending, by the mobile device, a request via the link from the mobile device, the request generated in response to the mobile device capturing the visual code; and
receiving, by the mobile device, the stored visualization at the mobile device in response to sending the request, wherein the visualization is stored with a key in a database table in the one or more database tables with the data set, the key allowing the visualization to be retrieved.

17. The method of claim 16, further comprising:
receiving, by the mobile device, a credential from the user at the application; and
including, by the mobile device, the credential in the request, wherein the credential is authenticated to determine the user is allowed to access the stored visualization.

18. The method of claim 16, further comprising:
performing, by the mobile device, an action with the visualization; and
sending, by the mobile device, a result of the action to the database system.

19. The method of claim 16, wherein the visual code is displayed on a non-electronic medium.

20. The method of claim 16, wherein the visual code is displayed on a display device.

* * * * *